(12) United States Patent
Zhou (10) Patent No.: US 12,200,391 B2
(45) Date of Patent: Jan. 14, 2025

(54) CORNER DETECTION METHOD AND CORNER DETECTION DEVICE

(71) Applicant: SAMSUNG ELECTRONICS CO., LTD., Suwon-si (KR)

(72) Inventor: Tengfei Zhou, XiAn (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 535 days.

(21) Appl. No.: 17/590,415

(22) Filed: Feb. 1, 2022

(65) Prior Publication Data

US 2022/0311910 A1    Sep. 29, 2022

(30) Foreign Application Priority Data

Mar. 25, 2021    (CN) .......................... 202110319031.3

(51) Int. Cl.
*G06T 7/181*       (2017.01)
*G06F 16/583*     (2019.01)
*H04N 5/14*       (2006.01)

(52) U.S. Cl.
CPC .......... *H04N 5/144* (2013.01); *G06F 16/5854* (2019.01)

(58) Field of Classification Search
CPC ...... H04N 5/144; G06F 16/5854; G06T 7/181; G06T 7/13; G06T 7/246; G06T 2207/10016
See application file for complete search history.

(56) References Cited

U.S. PATENT DOCUMENTS

| | | | |
|---|---|---|---|
| 10,217,229 B2 | 2/2019 | Cheng et al. | |
| 2022/0207672 A1* | 6/2022 | Seo | H04N 23/70 |
| 2023/0009479 A1* | 1/2023 | Suzuki | G06V 10/26 |
| 2023/0386082 A1* | 11/2023 | Zhou | H04N 17/002 |

FOREIGN PATENT DOCUMENTS

| | | |
|---|---|---|
| CN | 106340032 A | 1/2017 |
| CN | 105761277 B | 9/2018 |
| CN | 105023278 B | 3/2019 |

* cited by examiner

*Primary Examiner* — Phuoc Tran
(74) *Attorney, Agent, or Firm* — Sughrue Mion, PLLC (57) ABSTRACT

A corner detection method includes: acquiring a dynamic vision sensor (DVS) event frame, the DVS event frame including at least one event and being pre-divided into a plurality of areas; determining, of the at least one event, a number of events in each of the plurality of areas; detecting corners in each of the plurality of areas based on the number of events in each of the plurality of areas and a preset maximum number of corners; and obtaining a plurality of corners of the DVS event frame based on the detected corners.

18 Claims, 3 Drawing Sheets

CORNER DETECTION METHOD AND
CORNER DETECTION DEVICE

CROSS-REFERENCE TO RELATED
APPLICATION

This application is based on and claims priority under 35 U.S.C.§ 119 to Chinese Patent Application No. 202110319031.3, filed on Mar. 25, 2021 in China, the disclosure of which is incorporated by reference herein in its entirety.

BACKGROUND

1. Field

The disclosure relates to the field of video technology, and more specifically, to a corner detection method and a corner detection device.

2. Description of Related Art

An existing corner detection algorithm of a DVS (Dynamic Vision Sensor) event frame may first draw all events of an event frame into a bitmap image, and then use a traditional bitmap image-based algorithm to extract pixel information of all corners of the bitmap image, and then use the extracted pixel information as input of an optical flow algorithm. In such a corner detection algorithm, the DVS event frame must first be converted into the bitmap image, and then the bitmap image is used to check the information for calculating the corners. The calculation is very time-consuming, and it does not give full play to the unique event-driven hardware advantages of the DVS. In addition, such corner detection algorithm performs corner detection based on the static image (bitmap image), without considering the chronological order of the DVS events, and the extracted corners cannot reflect accurate information of moving targets.

SUMMARY

The disclosure provides a corner detection method and a corner detection device, to at least solve the above problems in the related art, but may not solve any of the above problems.

In accordance with an aspect of the disclosure, a corner detection method includes acquiring a dynamic vision sensor (DVS) event frame, the DVS event frame including at least one event and being pre-divided into a plurality of areas; determining, of the at least one event, a number of events in each of the plurality of areas; detecting corners in each of the plurality of areas based on the number of events in each of the plurality of areas and a preset maximum number of corners; and obtaining a plurality of corners of the DVS event frame based on the detected corners.

Therefore, according to the corner detection method of an embodiment, most suitable points may be directly found in a DVS event frame as corners for optical flow calculation, which avoids the operations of converting the DVS event frame into a bitmap image and then selecting the corners from the bitmap image by the existing corner detection algorithm, thereby getting rid of the dependence of the DVS event frame corner detection on the bitmap image, and giving full play to the hardware advantage of the DVS based on events, making processing performance of the optical flow algorithm, to which the corner detection method is applied, to improve greatly while similar accuracy on the DVS event frame is achieved.

Therefore, according to the corner detection method of an embodiment, the time sequence of DVS events is taken into consideration in the corner selection and the set of the latest event points in time is selected, so that the corner selection can better reflect the accurate information of the moving target.

According to a second aspect of the embodiments of the present disclosure, there is provided a corner detection device, including: an acquiring unit configured to acquire a dynamic vision sensor (DVS) event frame, the DVS event frame being pre-divided into a plurality of areas; an event number determining unit configured to determine a number of events in each of the plurality of areas; a detecting unit configured to detect corners in each of the plurality of areas based on the number of events in each of the plurality of areas and a preset maximum number of corners, to obtain corners of the DVS event frame. In accordance with an aspect of the disclosure, a corner detection device includes an acquiring unit configured to acquire a dynamic vision sensor (DVS) event frame, the DVS event frame including at least one event and being pre-divided into a plurality of areas; an event number determining unit configured to determine, of the at least one event, a number of events in each of the plurality of areas; a detecting unit configured to detect corners in each of the plurality of areas based on the number of events in each of the plurality of areas and a preset maximum number of corners, to obtain a plurality of corners of the DVS event frame.

Therefore, according to the corner detection device of an embodiment, most suitable points may be directly found in a DVS event frame as corners for optical flow calculation, which avoids the operations of converting the DVS event frame into a bitmap image and then selecting the corners from the bitmap image by the existing corner detection algorithm, thereby getting rid of the dependence of the DVS event frame corner detection on the bitmap image, and giving full play to the hardware advantage of the DVS based on events, making processing performance of the optical flow algorithm, to which the corner detection method of an embodiment is applied, to improve greatly while similar accuracy on the DVS event frame is achieved.

Therefore, according to the corner detection device of an embodiment, the time sequence of DVS events is taken into consideration in the corner selection, and the set of the latest event points in time is selected, so that the corner selection can better reflect the accurate information of the moving target.

In accordance with an aspect of the disclosure, a corner detection method includes determining a number of events in each area from among a plurality of areas of a dynamic vision sensor (DVS) event frame; selecting a group of areas from among the plurality of areas, the group of areas including a cumulative number of events greater than a predetermined percentage of a total number of events in the DVS event frame; and for each area from among the group of areas, determining a number of corners in the area as equal to a predetermined number of corners multiplied by a ratio of the number of events in the area to the cumulative number of events in the group of areas.

The technical solutions provided by embodiments of the disclosure may at least bring the following beneficial effects:

According to the corner detection method and the corner detection device of the disclosure, the most suitable points may be directly found in a DVS event frame as corners for optical flow calculation, which avoids the operations of converting the DVS event frame into a bitmap image and then selecting the corners from the bitmap image by the existing corner detection algorithm, thereby getting rid of the dependence of the DVS event frame corner detection on the bitmap image, and giving full play to the hardware advantage of the DVS based on events, making processing performance of the optical flow algorithm, to which the corner detection method of the disclosure is applied, to improve greatly while similar accuracy on the DVS event frame is achieved. In addition, the time sequence of DVS events is taken into consideration in the corner selection, the set of the latest event points in time is selected, so that the corner selection can better reflect the accurate information of the moving target.

It should be understood that the above general description and the following detailed description are only examples and explanatory, and cannot limit the present disclosure.

BRIEF DESCRIPTION OF THE DRAWINGS

The accompanying drawings herein are incorporated into the specification and constitute a part of the specification, show embodiments conforming to the disclosure, and are used together with the specification to explain the principle of the disclosure, and do not constitute improper limitation of the disclosure.

DETAILED DESCRIPTION

In order to enable those of ordinary skill in the art to better understand the technical solutions of the disclosure, the technical solutions in the embodiments of the disclosure will be described clearly and completely with reference to the accompanying drawings.

It should be noted that terms "first" and "second" in the specification and claims of the present disclosure and the above drawings are used to distinguish similar objects, and not necessarily used to describe a specific sequence or order. It should be understood that data used in this way may be interchanged under appropriate circumstances so that the embodiments of the present disclosure described herein may be implemented in a sequence other than those illustrated or described herein. The implementation manners described in the following embodiments do not represent all implementation manners consistent with the present disclosure. Rather, they are only examples of devices and methods consistent with some aspects of the present disclosure as detailed in the appended claims.

It should be noted here that "at least one of several items" appearing in the present disclosure means to include three parallel cases of "any one of the several items", "a combination of any plurality of the several items" and "all of the several items". For example, "including at least one of A and B" includes the following three parallel cases: (1) including A; (2) including B; (3) including A and B. Another example is "performing at least one of step one and step two", which indicates the following three parallel cases: (1) perform step one; (2) perform step two; (3) perform step one and step two.

It will be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present. Like numerals refer to like elements throughout.

Spatially relative terms, such as "over," "above," "on," "upper," "below," "under," "beneath," "lower," and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

For the sake of brevity, conventional elements to semiconductor devices may or may not be described in detail herein for brevity purposes.

Recently, in the fields of computer vision, artificial intelligence, robotics and the like, a dynamic vision sensor (DVS) camera has gradually become widely known. An imaging process of the DVS camera is asynchronous, each pixel thereof may autonomously generate an event according to change in the intensity of scene illumination. Specifically, at time $t_j$, if a brightness increment at a pixel position $u_j=(x_j,y_j)$ reaches a threshold $\pm c$ ($c>0$), then an event $e_j=(x_j,y_j,t_j,p_j)$ will be triggered, where $p_j \in \{+1, -1\}$ indicates the polarity of the event where a positive sign indicates an increase in brightness, and a negative sign indicates a decrease in brightness. Therefore, the output of the event camera is an asynchronous event stream, and since the event camera only records incremental change, the absolute value of the brightness of the scene is no longer directly visible. Compared with traditional cameras, the DVS camera may capture brightness changes at an almost unlimited frame rate and record events at specific time points and image positions, especially for moving scenes. The DVS camera has great advantages in data rate, speed and dynamic range.

Figure 1:
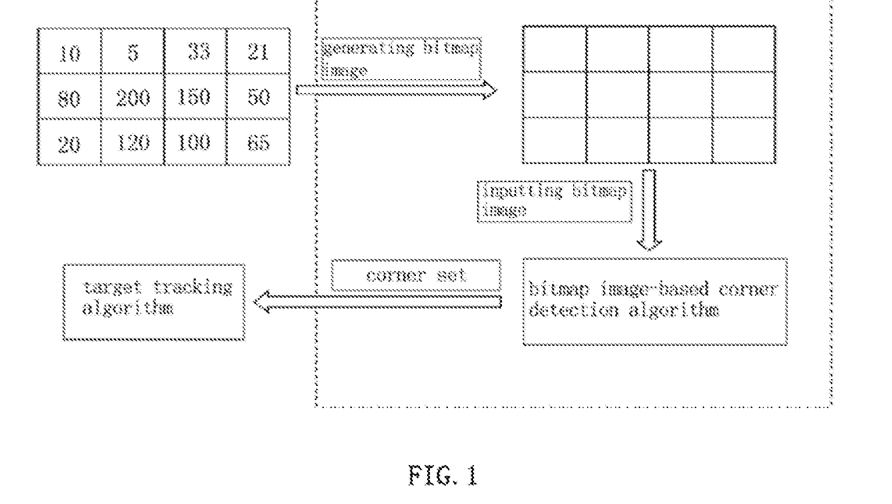
FIG. 1 is a schematic diagram showing an existing corner detection method of a DVS event frame.

However, for a DVS event frame, the existing method uses a bitmap to check information to calculate corners, which is very time-consuming and does not give full play to the unique event-driven hardware advantages of the DVS. FIG. 1 is a schematic diagram showing an existing corner detection method of a DVS event frame. As shown in FIG. 1, the existing corner detection method of the DVS event frame adopts a processing method similar to a traditional processing method of a CIS sensor image, which first converts the DVS event frame into a bitmap image, and then selects a corner set from the bitmap image using an existing corner detection algorithm, and finally uses the corner set for optical flow calculation, to calculate DVS optical flow. The existing corner detection algorithms include Moravec corner detection algorithm, Harris corner detection algorithm, Shi-Tomasi corner detection algorithm and FAST corner detection algorithm, etc., and all these existing corner detection algorithms are algorithms based on bitmap images. Therefore, the calculation of the existing corner detection method of the DVS event frame is very time-consuming, which greatly reduces the processing performance of the DVS camera. In addition, the existing corner detection method of the DVS event frame is based on the corner detection of the static image, and does not consider the time sequence of the DVS events, and cannot reflect the accurate information of the moving target.

In order to solve the above problems, a more reasonable corner detection method and a corner detection device are provided that conform to the characteristics of DVS hardware. Specifically, most suitable points may be directly found in a DVS event frame as corners for optical flow calculation, which avoids the operations of converting the DVS event frame into a bitmap image and then selecting the corners from the bitmap image using an existing corner detection algorithm, thereby getting rid of the dependence of the DVS event frame corner detection on the bitmap image, and giving full play to the hardware advantage of the DVS based on events, making processing performance of the optical flow algorithm, to which the corner detection method of an embodiment is applied, to improve greatly while similar accuracy on the DVS event frame is achieved. In addition, the time sequence of DVS events is taken into consideration in the corner selection, a set of the latest event points in time is selected, so that the corner selection can better reflect the accurate information of the moving target. Hereinafter, the corner detection method and the corner detection device according to one or more embodiments will be described in detail with reference to FIGS. 2 to 6.

Figure 2:
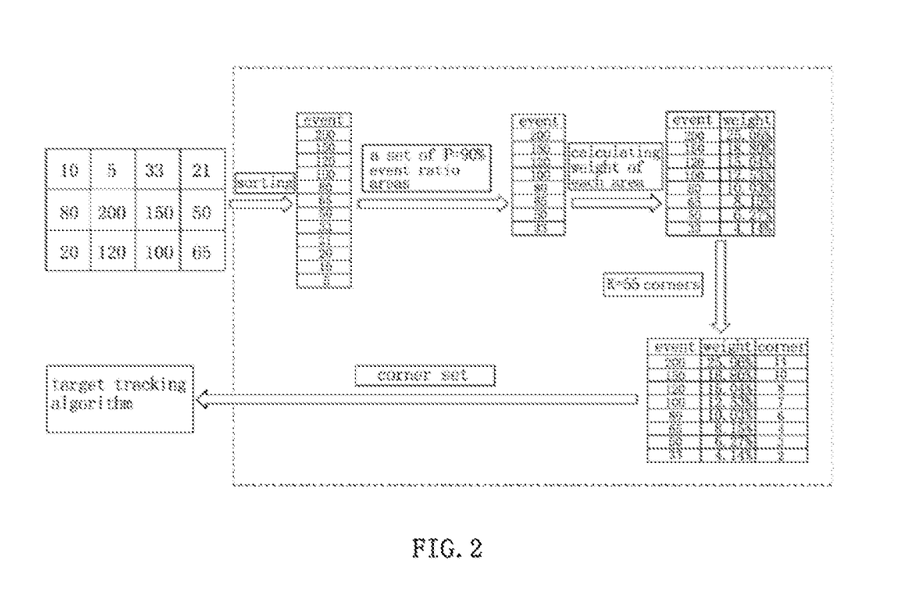
FIG. 2 is a schematic diagram illustrating a corner detection method of a DVS event frame according to an embodiment.

FIG. 2 is a schematic diagram illustrating a corner detection method of a DVS event frame according to an example embodiment.

Referring to FIG. 2, first, the DVS event frame may be divided into original event sets of a plurality of areas (for example, M×N areas) of the DVS event frame according to event coordinates. For example, as shown in FIG. 2, a DVS event frame may be divided into 4×3 areas, and the number in each area represents the number of events in the original event set of the area. Subsequently, the M×N areas of the original event sets may be sorted in a descending order according to the number of events in the areas to obtain a sorted event set A containing M×N areas. Subsequently, an event set B of former part areas of the event set A may be extracted which includes only those events in which a ratio of cumulative sum of the number of events to the total number of events of the event set A exceeds a preset percentage P. Subsequently, a weight set W including a weight of each area may be calculated according to the number of events in each area in the event set B. Subsequently, according to the weight of each area in the weight set W and a preset maximum number of corners K, a final number of corners of each area may be calculated according to the weight ratios, so that the sum of the final corners of each area does not exceed the preset maximum number of corners K. Subsequently, a corresponding number of the latest event points may be selected in each area according to the final corners of each area to obtain a final corner set S, as shown in the following formula (1).

$$S=\{s_i | s_i=\phi(k_i), k_i=Kw_i, w_i \in W\} \quad (1)$$

Wherein the number of corners in the final corner set S is less than or equal to K, $w_i$ is the i-th element in the weight set W, $k_i$ is the number of corners in the area corresponding to the i-th element in the weight set W, and the function $s_i=\phi(k_i)$ may correspond to the latest event points in the area corresponding to the i-th element in the weight set W.

The following Table 1 shows the information of the two preset parameters P and K according to an embodiment.

TABLE 1

| Parameter | Classification | Unit | Description |
|---|---|---|---|
| P | accuracy parameter | percentage | indicates the extraction percentage of the event frame areas, different scenes need to be set with different values |
| K | performance/ accuracy parameters | corner | indicates the maximum number of corners, different scenes need to be set with different values |

Therefore, the corner detection method of the DVS event frame according to an example embodiment may directly perform corner detection based on the DVS event frame (without converting to a bitmap image), reducing time loss and improving performance; in addition, the time sequence of DVS events may be considered, and the set of the latest event points may be selected as the corner set, which can better reflect the accurate information of the moving target.

Figure 3:
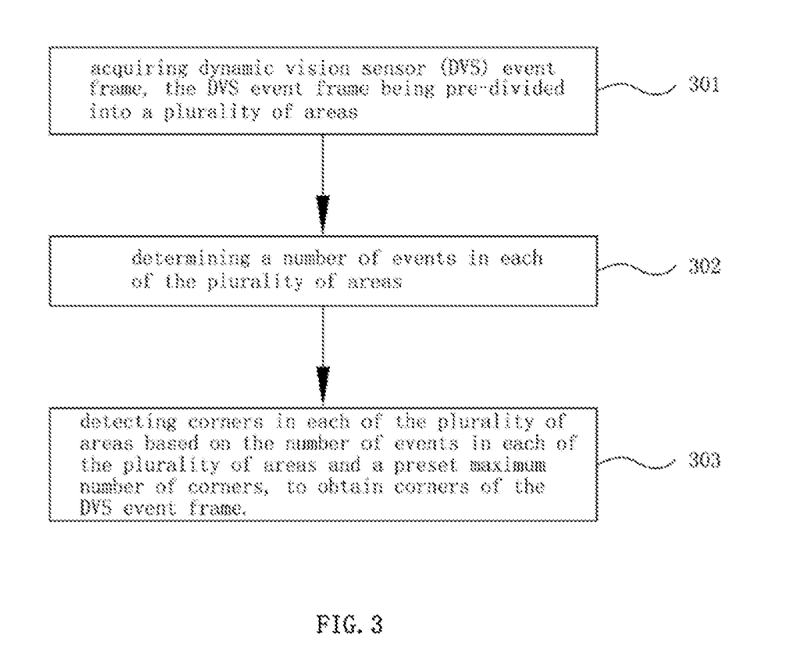
FIG. 3 is a flowchart illustrating a corner detection method according to an embodiment.

FIG. 3 is a flowchart illustrating a corner detection method according to an example embodiment.

With reference to FIG. 3, in step 301, a dynamic vision sensor (DVS) event frame may be acquired, where the DVS event frame may be pre-divided into a plurality of areas, for example, M×N areas, and value ranges of M and N are 1 to the maximum resolution of the width and the height of the DVS event frame, respectively.

According to an example embodiment, a DVS event frame may be acquired according to a predetermined time, for example, the DVS event frame is acquired every 10 ms, and the DVS event frame includes all events sensed by the DVS in the current 10 ms interval. In this case, the division areas of the DVS event frame may be determined in advance, or the division areas may also be determined after obtaining the DVS event frame.

According to an example embodiment, one DVS event frame may be obtained based on M, N, and a number of framing events E. Specifically, when the DVS event frame is predetermined to be divided into M×N areas, a number of events in each area is counted. As long as the number of events in one area reaches E, it is considered that one DVS event frame is acquired. In this case, the division areas of the DVS event frame need to be determined in advance. It can be seen that M, N, and E jointly determine the data volume of one DVS event frame. When the existing optical flow algorithm applies the DVS event frame to obtain the best effect (i.e., the best match of accuracy and performance), M, N and E may be optimized. For example, but not limited to, M=4, N=3, E=200 may be taken, that is, the DVS event frame is divided into M×N=12 areas, and when the number of events in an area reaches 200, it is considered to form one DVS event frame.

In step 302, a number of events in each of the plurality of areas may be determined. According to an example embodiment, the number of events in each of the plurality of areas may be counted according to location information of each event in the DVS event frame and location information of each of the plurality of areas. Here, the location information may be coordinate information. An event $e_j=(x_j, y_j, t_j, p_j)$ may include event coordinate information $(x_j, y_j)$, time information $t_j$, and brightness change information $p_j$. Therefore, an area where each event is located may be determined according to the location information carried by each event and the location information of each area, so as to count the number of events in each area.

In step 303, corners in each of the plurality of areas may be detected based on the number of events in each of the plurality of areas and a preset maximum number of corners, to obtain corners of the DVS event frame.

According to an example embodiment, at least one area where corners can be distributed may be determined from among the plurality of areas, and corners in each of the at least one area are detected based on a number of events in each of the at least one area and the preset maximum number of corners.

Hereinafter, an example embodiment of how to determine the at least one area where corners can be distributed will be specifically introduced.

According to an example embodiment, corners may be acquired from all areas of the DVS event frame. Therefore, all areas of the plurality of divided areas may be determined as the at least one area where corners can be distributed.

According to an example embodiment, corners may be acquired from a part (e.g., only some) of the areas of the DVS event frame. Therefore, it is possible to determine which areas of the DVS event frame from which corners can be obtained according to the number of events in each area. For example, the number of events in each of the plurality of areas may be summed to obtain a total number of events in the DVS event frame, and at least one area from among the plurality of areas may be selected sequentially in a descending order of the number of events in each area, until a ratio of a cumulative sum of the number of events in the selected at least one area to the total number of events in the DVS event frame is equal to or greater than a preset area extraction percentage P, and the selected at least one area may be used as the at least one area where corners can be distributed. Here, the area extraction percentage P refers to a percentage value of the cumulative sum of the number of events in the extraction areas. The parameter P is a precision parameter, and its value range may be any percentage other than 0, and may be set as different values according to different scene precision requirements. For example, for a target motion scene close to an entire picture, the larger the value of the parameter P is, the better the effect of the algorithm is, and the highest value may be 100% (that is, the corners are obtained from all areas of the DVS event frame), because the higher percentage can better reflect the movement information of the whole picture. For another example, the smaller the moving target is, if the smaller the parameter P is, the better the effect of the algorithm is, but the parameter P cannot be 0, because the motion event information is more concentrated in a small area.

Hereinafter, an example embodiment of how to detect corners on the determined at least one area will be specifically introduced.

According to an example embodiment, first, the number of events in the at least one area may be summed to determine a first total number of events.

Subsequently, a corner distribution weight of each of the at least one area may be determined based on the first total number of events and the number of events of each of the at least one area. For example, the corner distribution weight of each of the at least one area may be determined according to a ratio of the number of events in each of the at least one area to the first total number of events.

Subsequently, the number of corners in each of the at least one area may be determined based on the preset maximum number of corners and the corner distribution weight of each of the at least one area. For example, the number of corners allocated to each of the at least one area may be obtained by multiplying the corner distribution weight of each of the at least one area by the preset maximum number of corners, wherein the sum of the number of corners allocated to each of the at least one area is not greater than the preset maximum number of corners. Here, the preset maximum number of corners K refers to a preset maximum number of corners in one DVS event frame. The parameter K is a performance parameter and also a precision parameter, and its value range may be any positive integer that does not exceed the resolution of the DVS event frame, and may be set as different values in different scenes. For the value of K, in any scene, the larger K is, the higher the accuracy is, but the performance may be lower. However, as K increases, the accuracy may not increase linearly, but the performance may decrease linearly. Therefore, after fixing the parameter P, by measuring the accuracy curves and the performance value curves corresponding to different K values in the current scene, the value of the parameter K with the best accuracy and the best performance may be found.

Subsequently, corners distributed in each of the at least one area may be determined based on the number of corners in each of the at least one area. For example, the following operations may be performed for each of the at least one area: determining the latest n event points in time in the current area as the corners distributed in the current area, where n is the determined number of corners in the current area. For example, each event in the current area may be sorted from new to old according to time information of each event in the current area, and the pixel points where the top n events are located may be determined as the corners distributed in the current area. As described above, an event $e_j=(x_j, y_j, t_j, p_j)$ may include event coordinate information $(x_j, y_j)$, time information $t_j$, and brightness change information $p_j$. A time point at which each event occurs may be determined according to the time information $t_j$ carried by each event, and for each area, the pixel points where the latest n events in time are located are selected as the corners distributed in the current area, thereby selecting the corners with full consideration of the time sequence of the DVS events, so as to better reflect the accurate information of the moving target.

In the following, taking the example data in FIG. 2 as an example, the corner detection method according to an example embodiment will be described in detail. In FIG. 2, suppose P=90% and K=55.

As shown in FIG. 2, the DVS event frame may be divided into 4*3=12 grid areas, and the number of events in each area is counted, for example, 10, 5, 33, 21, 80, 200, 150, 50, 20, 120, 100, 65, and the total number of events in the DVS event frame may be 854.

These 12 grid areas may be sorted similar to the grids in the figure according to the number of events in the grid areas. In other words, the areas may be sorted in descending order of the number of events. For example, the 12 grid areas are sorted according to the number of events from largest to smallest, that is, 200, 150, 120, 100, 80, 65, 50, 33, 21, 20, 10, 5.

Areas where the ratio of the cumulative sum of the number of events to the total number of events (854) of the DVS event frame is equal to or greater than P=90% are selected, that is, the areas where the number of events is 200, 150, 120, 100, 80, 65, 50, and 33 are selected, and the total number of events in the selected areas is 798. In other words, a group of areas may be selected that include a cumulative number of events that is greater than a predetermined percentage (P=90%) of the total number of events (854). Beginning with the area having the largest number of events and continuing through the ordered areas, each area may be added to the group of areas until the cumulative number of events in the group of areas is greater than the predetermined percentage (P=90%) of the total number of events (854). Any remaining areas may not be selected, e.g., the areas where the number of events is 21, 20, 10, and 5.

According to a ratio of the number of events in each selected area to the total number of events in the selected areas (798), the corner distribution weight of each selected area may be determined, that is, the corner distribution weight is 200/798=25.06%, 150/798=18.8%, 120/798=15.04%, 100/798=12.53%, 80/798=10.03%, 65/798=8.15%, 50/798=6.27%, 33/798=4.14%.

The number of corners may be assigned to each area according to the determined corner distribution weight of each area, so that the total number of corners in the selected areas is not more than K=55, that is, according to the ratios of the corner distribution weights, the number of corners is distributed as 14, 10, 8, 7, 6, 4, 3, 2. In other words, the number of corners in each area may be determined as equal to a predetermined number of corners (K=55) multiplied by a ratio of the number of events in the area to the cumulative number of events in the group of areas (798).

According to the determined number of corners in each area, the latest event points of the determined number of corners in each area are determined as the corners. For example, for an area where the number of corners is 14, the latest 14 event points in time may be selected as the corners of the area, and so on. In this way, the corner set of the DVS event frame may be obtained, which may be used as the subsequent input of the target tracking algorithm.

Figure 4:
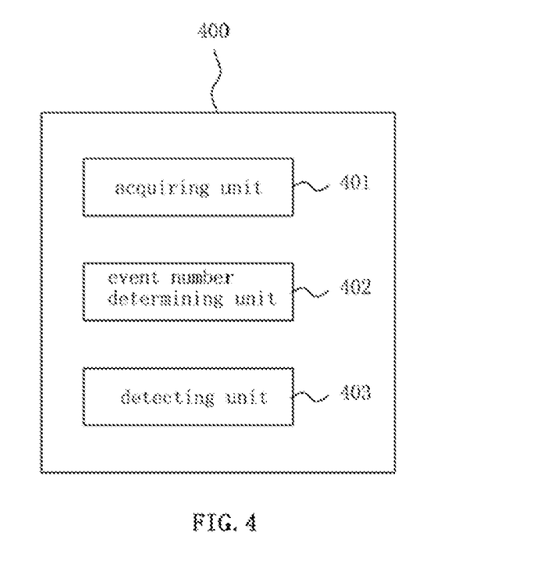
FIG. 4 is a block diagram showing a corner detection device according to an embodiment.

FIG. 4 is a block diagram showing a corner detection device according to an example embodiment.

With reference to FIG. 4, a corner detection device 400 may include an acquiring unit 401, an event number determining unit 402, and a detecting unit 403.

The acquiring unit 401 may acquire a dynamic vision sensor (DVS) event frame, where the DVS event frame is pre-divided into a plurality of areas. For example, for M×N areas, the value ranges of M and N are 1 to the maximum resolutions of the width and the height of the DVS event frame, respectively.

According to an example embodiment, the acquiring unit 401 may acquire a DVS event frame according to a predetermined time, for example, one DVS event frame is acquired every 10 ms, and the DVS event frame includes all events sensed by the DVS in the current 10 ms interval. In this case, the division areas of the DVS event frame may be determined in advance, or the division areas may also be determined after obtaining the DVS event frame.

According to an example embodiment, the acquiring unit 401 may acquire one DVS event frame according to M, N, and a number of framing events E. Specifically, when the DVS event frame is predetermined to be divided into M×N areas, a number of events in each area is counted. When the number of events in one area reaches E, it is considered that the DVS event frame is acquired. In this case, the division areas of the DVS event frame need to be determined in advance. It can be seen that M, N, and E jointly determine the data volume of one DVS event frame. When the existing optical flow algorithm applies the DVS event frame to obtain the best effect (i.e., the best match of accuracy and performance), M, N and E may be optimized. For example, but not limited to, M=4, N=3, E=200 may be taken, that is, the DVS event frame is divided into M×N=12 areas, and when the number of events in an area reaches 200, it is considered to form one DVS event frame.

The event number determining unit 402 may determine a number of events in each of the plurality of areas. According to an example embodiment, the event number determining unit 402 may count the number of events in each of the plurality of areas according to location information of each event in the DVS event frame and location information of each of the plurality of areas. Here, the location information may be coordinate information. An event $e_j=(x_j, y_j, t_j, p_j)$ may include event coordinate information $(x_j, y_j)$, time information $t_j$, and brightness change information $p_j$. Therefore, the event number determining unit 402 may determine an area where each event is located according to the location information carried by each event and the location information of each area, so as to count the number of events in each area.

The detecting unit 403 may detect corners in each of the plurality of areas based on the number of events in each of the plurality of areas and a preset maximum number of corners, to obtain corners of the DVS event frame.

According to an example embodiment, the detecting unit 403 may determine at least one area where corners can be distributed from among the plurality of areas, and detect corners in each of the at least one area based on a number of events in each of the at least one area and the preset maximum number of corners.

Hereinafter, an example embodiment of how the detecting unit 403 determines the at least one area where corners can be distributed will be specifically introduced.

According to an example embodiment, the detecting unit 403 may acquire corners from all areas of the DVS event frame. Therefore, the detecting unit 403 may determine all areas of the plurality of divided areas as the at least one area where corners can be distributed.

According to an example embodiment, the detecting unit 403 may acquire corners from a part (e.g., only some) of the areas of the DVS event frame. Therefore, the detecting unit 403 may determine which areas of the DVS event frame from which corners can be obtained according to the number of events in each area. For example, the detecting unit 403 may sum the number of events in each of the plurality of areas to obtain a total number of events in the DVS event frame, and select at least one area from among the plurality of areas sequentially in a descending order of the number of events in each area, until a ratio of a cumulative sum of the number of events in the selected at least one area to the total number of events in the DVS event frame is equal to or greater than a preset area extraction percentage P, and use the selected at least one area as the at least one area where corners can be distributed. Here, the area extraction percentage P refers to a percentage value of the cumulative sum of the number of events in the extraction areas. The parameter P is a precision parameter, and its value range may be any percentage other than 0, and may be set as different values according to different scene precision requirements. For example, for a target motion scene close to an entire picture, the larger the value of the parameter P is, the better the effect of the algorithm is, and the highest value may be 100% (that is, the corners are obtained from all areas of the DVS event frame), because the higher percentage can better reflect the movement information of the whole picture. For another example, the smaller the moving target is, if the smaller the parameter P is, the better the effect of the algorithm is, but the parameter P cannot be 0, because the motion event information is more concentrated in a small area.

Hereinafter, an example embodiment of how the detecting unit 403 detects corners on the determined at least one area will be specifically introduced.

According to an example embodiment, first, the detecting unit 403 may sum the number of events in the at least one area to determine a first total number of events.

Subsequently, the detecting unit 43 may determine a corner distribution weight of each of the at least one area based on the first total number of events and the number of events of each of the at least one area. For example, the detecting unit 403 may determine the corner distribution weight of each of the at least one area according to a ratio of the number of events in each of the at least one area to the first total number of events.

Subsequently, the detecting unit 403 may determine the number of corners in each of the at least one area based on the preset maximum number of corners and the corner distribution weight of each of the at least one area. For example, the detecting unit 403 may obtain the number of corners allocated to each of the at least one area by multiplying the corner distribution weight of each of the at least one area by the preset maximum number of corners, wherein the sum of the number of corners allocated to each of the at least one area is not greater than the preset maximum number of corners. Here, the preset maximum number of corners K refers to a preset maximum number of corners in one DVS event frame. The parameter K is a performance parameter and also a precision parameter, and its value range may be any positive integer that does not exceed the resolution of the DVS event frame, and may be set as different values in different scenes. For the value of K in any scene, the larger the K is, the higher the accuracy is, but the performance may be lower. However, as K increases, the accuracy may not increase linearly, but the performance may decrease linearly. Therefore, after fixing the parameter P, by measuring the accuracy curves and the performance value curves corresponding to different K values in the current scene, the value of the parameter K with the best accuracy and the best performance may be found.

Subsequently, the detecting unit 403 may determine corners distributed in each of the at least one area based on the number of corners in each of the at least one area. For example, the detecting unit 403 may perform the following operations for each of the at least one area: determining the latest n event points in time in the current area as the corners distributed in the current area, where n is the determined number of corners in the current area. For example, the detecting unit 403 may sort each event in the current area from new to old according to time information of each event in the current area, determine the pixel points where the top n events are located as the corners distributed in the current area. As described above, an event $e_j=(x_j, y_j, t_j, p_j)$ may include event coordinate information $(x_j, y_j)$, time information $t_j$, and brightness change information $p_j$. The detecting unit 403 may determine a time point at which each event occurs according to the time information $t_j$ carried by each event, and for each area, the pixel points where the latest n events in time are selected as the corners distributed in the current area, thereby selecting the corners with full consideration of the time sequence of the DVS events, so as to better reflect the accurate information of the moving target.

Figure 5:
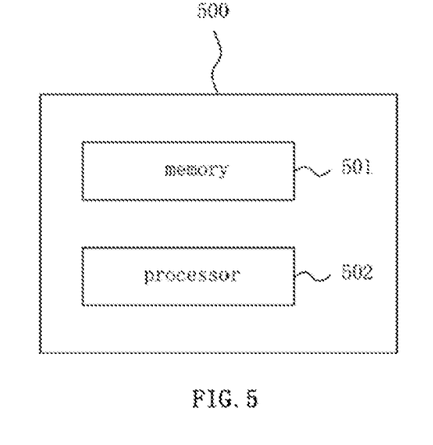
FIG. 5 is a block diagram of an electronic device 500 according to an embodiment.

FIG. 5 is a block diagram of an electronic device 500 according to an example embodiment.

With reference to FIG. 5, the electronic device 500 includes at least one memory 501 and at least one processor 502. The at least one memory 501 stores a set of computer-executable instructions. When the set of computer-executable instructions is executed by the at least one processor 502, a corner detection method according to an example embodiment is performed.

As an example, the electronic device 500 may be a PC computer, a tablet device, a personal digital assistant, a smart phone, or other devices capable of executing the above set of instructions. Here, the electronic device 500 does not have to be a single electronic device, and may also be any device or a collection of circuits that can execute the foregoing instructions (or instruction set) individually or jointly. The electronic device 500 may also be a part of an integrated control system or a system manager, or may be configured as a portable electronic device interconnected with a local or remote interface (for example, via wireless transmission).

In the electronic device 500, the processor 502 may include a central processing unit (CPU), a graphics processing unit (GPU), a programmable logic device, a dedicated processor system, a microcontroller, or a microprocessor. By way of example and not limitation, the processor may also include analog processors, digital processors, microprocessors, multi-core processors, processor arrays, network processors, etc.

The processor 502 may run instructions or codes stored in the memory 501, where the memory 501 may also store data. The instructions and data may also be sent and received via a network interface device over network, where the network interface device may use any known transmission protocol.

The memory 501 may be integrated with the processor 502, for example, RAM or flash memory is arranged in an integrated circuit microprocessor or the like. In addition, the memory 501 may include an independent device, such as an external disk drive, a storage array, or any other storage device that may be used by a database system. The memory 501 and the processor 502 may be operatively coupled, or may communicate with each other through an I/O port, a network connection, etc., so that the processor 502 may read files stored in the memory.

In addition, the electronic device 500 may also include a video display (such as a liquid crystal display) and a user interaction interface (such as a keyboard, a mouse, a touch input device, etc.). All components of the electronic device 500 may be connected to each other via a bus and/or a network.

According to an example embodiment, a computer-readable storage medium may also be provided, wherein when instructions in the computer-readable storage medium are executed by at least one processor, the at least one processor is caused to perform a corner detection method according to an embodiment. Examples of computer-readable storage media here include: read only memory (ROM), random access programmable read only memory (PROM), electrically erasable programmable read only memory (EEPROM), random access memory (RAM), dynamic random access memory (DRAM), static random access memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blu-ray or optical disc storage, hard disk drive (HDD), solid state Hard disk (SSD), card storage (such as multimedia card, secure digital (SD) card or extremely fast digital (XD) card), magnetic tape, floppy disk, magneto-optical data storage device, optical data storage device, hard disk, solid state disk and any other devices, which are configured to store computer programs and any associated data, data files and data structures in a non-transitory manner and provide the computer programs and any associated data, data files and data structures to the processor or computer such that the processor or computer executes the computer programs. The computer programs in the above computer-readable storage medium may run in an environment deployed in computer equipment such as a client, a host, an agent device, a server, etc. In addition, in an example, the computer programs and any associated data, data files and data structures are distributed on a networked computer system, so that the computer programs and any associated data, data files and data structures are stored, accessed, and executed in a distributed manner through one or more processors or computers.

According to a corner detection method and a corner detection device of one or more example embodiments of the disclosure, most suitable points may be directly found in a DVS event frame as corners for optical flow calculation, which avoids the operations of converting the DVS event frame into a bitmap image and then selecting the corners from the bitmap image by an existing corner detection algorithm, thereby getting rid of the dependence of the DVS event frame corner detection on the bitmap image, and giving full play to the hardware advantage of the DVS based on events, making processing performance of the optical flow algorithm, to which the corner detection method of the disclosure is applied, to improve greatly while similar accuracy on the DVS event frame is achieved. In addition, the time sequence of DVS events is taken into consideration in the corner selection, and a set of the latest event points in time is selected, so that the corner selection can better reflect the accurate information of the moving target.

Those skilled in the art will easily conceive of other embodiments of the disclosure after considering the specification and practicing embodiments disclosed herein. The disclosure is intended to cover any variations, uses, or adaptive changes of the disclosure. These variations, uses, or adaptive changes follow the general principle of the disclosure and include common knowledge or conventional technical means in the technical field which may or may not be expressly disclosed in the disclosure. The description and embodiments are only regarded as examples, and the true scope and spirit of the disclosure are pointed out by the following claims.

It should be understood that the disclosure is not limited to the precise structures that have been described above and shown in the drawings, and various modifications and changes may be made without departing from its scope. The scope of the disclosure is only limited by the appended claims.

What is claimed is:

1. A corner detection method comprising:
   acquiring a dynamic vision sensor (DVS) event frame, the DVS event frame comprising at least one event and being pre-divided into a plurality of areas;
   determining, from among the at least one event, a number of events in each of the plurality of areas; and
   detecting corners in each of the plurality of areas based on the number of events in each of the plurality of areas and a preset maximum number of corners, to obtain the corners of the DVS event frame.

2. The corner detection method of claim 1, wherein the determining the number of events in each of the plurality of areas comprises:
   counting the number of events in each of the plurality of areas according to location information about each of the at least one event in the DVS event frame and location information about each of the plurality of areas.

3. The corner detection method of claim 1, wherein the detecting the corners in each of the plurality of areas based on the number of events in each of the plurality of areas and the preset maximum number of corners comprises:
   determining at least one area from among the plurality of areas where corners can be distributed;
   detecting corners in each of the at least one area based on a number of events in each of the at least one area and the preset maximum number of corners.

4. The corner detection method of claim 3, wherein the determining the at least one area where corners can be distributed comprises:
   determining the plurality of areas as the at least one area where corners can be distributed.

5. The corner detection method of claim 3, wherein the determining the at least one area where corners can be distributed comprises:
   summing the number of events in each area of the plurality of areas to obtain a total number of events in the DVS event frame;
   selecting at least one area from among the plurality of areas sequentially in a descending order of the number of events in each area, until a ratio of a cumulative sum of the number of events in the selected at least one area to the total number of events in the DVS event frame is equal to or greater than a preset area extraction percentage; and
   using the selected at least one area as the at least one area where corners can be distributed.

6. The corner detection method of claim 3, wherein the detecting the corners in each of the at least one area comprises:
   summing the number of events in the at least one area to determine a first total number of events;
   determining a corner distribution weight of each of the at least one area based on the first total number of events and the number of events in each of the at least one area;
   determining a number of corners in each of the at least one area based on the preset maximum number of corners and the corner distribution weight of each of the at least one area;
   determining corners distributed in each of the at least one area based on the number of corners in each of the at least one area.

7. The corner detection method according to claim 6, wherein the determining the corner distribution weight of each of the at least one area comprises:
   determining the corner distribution weight of each of the at least one area according to a ratio of the number of events in each of the at least one area to the first total number of events.

8. The corner detection method according to claim 6, wherein the determining the corners distributed in each of the at least one area comprises:
   for each of the at least one area, determining the latest n event points in time in the area as the corners distributed in the area, where n is a predetermined number.

9. A corner detection device comprising:
   an acquiring unit configured to acquire a dynamic vision sensor (DVS) event frame, the DVS event frame comprising at least one event and being pre-divided into a plurality of areas;
   an event number determining unit configured to determine, from among the at least one event, a number of events in each of the plurality of areas;

a detecting unit configured to detect corners in each of the plurality of areas based on the number of events in each of the plurality of areas and a preset maximum number of corners, to obtain the corners of the DVS event frame.

10. The corner detection device of claim 9, wherein the event number determining unit is configured to:
   count the number of events in each of the plurality of areas according to location information about each of the at least one event in the DVS event frame and location information about each of the plurality of areas.

11. The corner detection device of claim 9, wherein the detecting unit is configured to:
   determine at least one area from among the plurality of areas where corners can be distributed;
   detect corners in each of the at least one area based on a number of events in each of the at least one area and the preset maximum number of corners.

12. The corner detection device of claim 11, wherein the detecting unit is configured to:
   determine the plurality of areas as the at least one area where corners can be distributed.

13. The corner detection device of claim 11, wherein the detecting unit is configured to:
   sum the number of events in each area of the plurality of areas to obtain a total number of events in the DVS event frame;
   select at least one area from among the plurality of areas sequentially in a descending order of the number of events in each area, until a ratio of a cumulative sum of the number of events in the selected at least one area to the total number of events in the DVS event frame is equal to or greater than a preset area extraction percentage; and
   use the selected at least one area as the at least one area where corners can be distributed.

14. The corner detection device of claim 11, wherein the detecting unit is configured to:
   sum the number of events in the at least one area to determine a first total number of events;
   determine a corner distribution weight of each of the at least one area based on the first total number of events and the number of events in each of the at least one area;
   determine a number of corners in each of the at least one area based on the preset maximum number of corners and the corner distribution weight of each of the at least one area;
   determine corners distributed in each of the at least one area based on the number of corners in each of the at least one area.

15. The corner detection device of claim 14, wherein the detecting unit is configured to:
   determine the corner distribution weight of each of the at least one area according to a ratio of the number of events in each of the at least one area to the first total number of events.

16. The corner detection device of claim 14, wherein the detecting unit is configured to:
   for each of the at least one area, determining the latest n event points in time in the area as the corners distributed in the area, where n is a predetermined number.

17. A corner detection method comprising:
   determining a number of events in each area from among a plurality of areas of a dynamic vision sensor (DVS) event frame;
   selecting a group of areas from among the plurality of areas, the group of areas comprising a cumulative number of events greater than a predetermined percentage of a total number of events in the DVS event frame; and
   for each area from among the group of areas, determining a number of corners in the area as equal to a predetermined number of corners multiplied by a ratio of the number of events in the area to the cumulative number of events in the group of areas.

18. The corner detection method of claim 17, wherein the selecting the group of areas comprises:
   sorting the plurality of areas in descending order of the number of events;
   beginning with an area comprising the largest number of events and continuing through the ordered plurality of areas, adding each area to the group of areas until the cumulative number of events in the group of areas is greater than the predetermined percentage of the total number of events in the DVS event frame.

* * * * *